United States Patent
Liu et al.

(10) Patent No.: US 7,401,074 B2
(45) Date of Patent: *Jul. 15, 2008

(54) CANONICALIZATION OF TERMS IN A KEYWORD-BASED PRESENTATION SYSTEM

(75) Inventors: Hongche Liu, Fremont, CA (US); Ravi Narasimhan Raj, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 11/282,435

(22) Filed: Nov. 17, 2005

(65) Prior Publication Data

US 2006/0074853 A1    Apr. 6, 2006

Related U.S. Application Data (63) Continuation of application No. 10/703,688, filed on Nov. 7, 2003, now Pat. No. 7,007,014.

(60) Provisional application No. 60/460,657, filed on Apr. 4, 2003.

(51) Int. Cl.
*G06F 17/30* (2006.01)
(52) U.S. Cl. ............................ 707/3; 707/104.1; 705/27
(58) Field of Classification Search ................. 707/3–5, 707/10, 104.1; 705/27, 37
See application file for complete search history.

(56) References Cited

U.S. PATENT DOCUMENTS

| | | |
|---|---|---|
| 5,704,060 A | 12/1997 | Del Monte |
| 6,006,225 A | 12/1999 | Bowman et al. |
| 6,873,996 B2 | 3/2005 | Chand |
| 2002/0116170 A1 | 8/2002 | Corman et al. |
| 2003/0083959 A1 | 5/2003 | Song et al. |
| 2003/0101044 A1 | 5/2003 | Krasnov |
| 2003/0208474 A1 | 11/2003 | Soulanille et al. |
| 2004/0093327 A1 | 5/2004 | Anderson et al. |

*Primary Examiner*—Leslie Wong
(74) *Attorney, Agent, or Firm*—Hickman Palermo Truong & Becker LLP (57) ABSTRACT

A presentation system accepts presentations or references to presentations from prospective presenters. Some or all of the presentations or references are stored in a database and referenced by keywords such that presentations to be presented in response to particular searches can be identified. A presentation manager handles accepting bids and settling terms between prospective presenters. A presentation server handles retrieving presentations from a presentation details database for presentation to users along with requests such as search results. Both the presentation manager and the presentation server can operate on a keywords-basis, wherein presentation terms specify keywords to be associated with particular presentations and the presentation server serves particular presentations based on keywords in a search query for which the presentations are to be returned. The association of keywords can be done using canonicalization so that, under certain conditions, different keywords are treated as the same keyword.

8 Claims, 6 Drawing Sheets

Yahoo!

300

| Search Results | camera | Search | Advanced Search / About These Results |

Your search: camera    Search in: The Web | Directory | News

Inside Yahoo! — 302

Auctions: over 800 Camera products on Yahoo! Auctions
Yellow Pages: find a Camera Store near you

Directory Category Matches    1 - 3 of 25 | Next 20

304
- Photography > Cameras
- Shopping > Cameras
- List "camera" results by location

Sponsor Matches    (What are Sponsor Matches?)

306
- Camera Specials - Cameras for sale. Complete kits starting at $50.
  www.-----.com

- Camera - Compare Prices at -----.com - At ----.com, compare prices, ratings and reviews from name brand stores.

- Digital & 35mm Cameras - Vestibulum condimentum tortor vitae urna. Mauris at ante lacinia leo lacinia suscipit.
  www.loremipsumserwer

Web Matches    1 - 4 of 14,800,000 | Next 4

308
1. La Camera - Praesent ultrices orci. Aenean pretium, neque quis dapibus sodales.
   www.-----.com/ search within this site
2. Digital Camera Resource Page - Praesent non orci. Aenean pretium, neque quis dapibus sodales, sem augue.
   www.camera------resource.com/ search within this site
   ↳ More sites about: Digital Photography
3. Camera, The
   www.thecamera------.com/ search within this site
   ↳ More sites about: Local > Newspapers
4. Camera Studies - pharetra enim, porttitor lacinia magna felis ac lectus. Integer sapien diam, gravida id.
   www.camera-studies------.org/ search within this site

310

——— ADVERTISEMENT ———

Search in: The Web | Directory | News

312 — Related Searches: digital camera, camera review, hidden camera, video camera 314
| There are more results for camera in... | Search in other search engines |
| Yahoo! Shopping, Yahoo! Yellow Pages, Yahoo! Auctions and Yahooligans! | More... |

CANONICALIZATION OF TERMS IN A KEYWORD-BASED PRESENTATION SYSTEM

RELATED APPLICATIONS AND CLAIM OF PRIORITY

This application is a continuation application that claims priority to U.S. patent application Ser. No. 10/703,688, filed Nov. 7, 2003 now U.S. Pat. No. 7,007,014, entitled "CANONICALIZATION OF TERMS IN A KEYWORD-BASED PRESENTATION SYSTEM," by Hongche Liu and Ravi Narasimhan Raj, which claims priority from U.S. Provisional Patent Application Ser. No. 60/460,657, filed Apr. 4, 2003, entitled "CANONICALIZATION OF TERMS IN A KEYWORD-BASED PRESENTATION SYSTEM," the entire contents both of which are hereby incorporated by reference in their entirety for all purposes.

FIELD OF THE INVENTION

The present invention relates to a presentation system wherein display objects are presented in response to actions of a user and more particularly to actions of a user in entering terms.

BACKGROUND OF THE INVENTION

One popular presentation system is popularly known as the "World Wide Web", "WWW" or simply the "Web". In a typical use, a user uses a Web client (such as a browser) to issue a request identified with a Uniform Resource Locator ("URL") to a Web server and the Web server returns a page to the Web client. The Web client then might render the returned page and present it to the user in response to the user's request. The page might contain more than one element. Examples of elements include text, images, banner advertisements, image maps, clickable areas, JavaScript™ objects, Java™ objects, imbedded code, etc.

A presentation of a page in response to a request might be in response to more than just a URL, but might include form data, user data and history data. For example, a request from a Web client might include search terms entered by the user to which the Web server responds by determining a set of search results based on the search terms, user data and/or the page in which the user entered the search terms, etc., and returning a page containing some or all of the search results and possibly including one or more "presentations". A presentation can be a banner advertisement, a clickable link, an area of text, an area of image or video, an area delineated by HTML code or the like, a pop-up window, a pop-under window, etc., that appears to the user with, or associated with, the search results.

Some presentations might be independent of the search terms, user data, time, date or page on which the user enters their search terms, etc. (collectively, the "state" of the search). Examples of state-independent presentations might be a "help" button, a "home" button, a search provider logo or a system-wide advertisement.

Where the Web server has, appears to have, or is linked to, a computing system that has search capabilities, the system is often referred to as a search server. Some known search servers customize presentations based on the search terms used by the user. For example, a number of advertisers might provide the operator of a search server with advertisements and pay to have those advertisements included as presentations on pages containing search results and to do so in a targeted manner, so that users see more relevant advertisements. As an example, an automobile manufacturer might provide advertisements that are to be presented along with search results when the user's search term(s) included that manufacturer's trademark. In another example, an advertiser might provide a set of links, wherein the presentation to the user includes search results and one or more "sponsored" links, wherein each sponsored link is presented at the behest of a sponsor interested in having the link presented to selected users of the search server.

The user can be a human user interacting with a user interface of a computer that processes the requests and/or forwards the requests to other computer systems. The user could also be another computer process or system that generates the request programmatically. In the latter instance, it is likely that the requesting computer user will also programmatically process the results of the request, but it might instead be the case that a computer user makes a request and a human user is the ultimate recipient of the response, or even the opposite, where a human user makes a request and a computer user is the ultimate recipient of the response.

One common system and set of protocols in use today is referred to as the Internet, a global internetwork of networks, wherein nodes of the network send requests to other nodes that might respond with content, such as search results. One protocol usable for content requesting is the HyperText Transport Protocol (HTTP), wherein an HTTP client, such as a browser) makes a request for content referenced by a Uniform Resource Locator (URL) and an HTTP server responds to the requests by sending content specified by the URL. Of course, while this is a very common example, content retrieval is not so limited.

For example, networks other than the Internet might be used, such as token ring, WAP, overlay, point-to-point, proprietary networks, etc. Protocols other than HTTP might be used to request and transport content, such as SMTP, FTP, etc. and content might be specified by other than URL's. Portions of present invention are described with reference to the Internet, a global internetwork of networks in common usage today for a variety of applications, but it should be understood that references to the Internet can be substituted with references to variations of the basic concept of the Internet (e.g., intranets, virtual private networks, enclosed TCP/IP networks, etc.) as well as other forms of networks. It should also be understood that the present invention might operate entirely within one computer or one collection of computers, thus obviating the need for a network.

The content itself could be in many forms. For example, some content might be text, images, video, audio, animation, program code, data structures, formatted text, etc. For example, a user might request content that is a page having a news story (text) and an accompanying image, with links to other content (such as by formatting the content according to the HyperText Markup Language (HTML) is use at the time). Search results are generally thought of as listings of hits generated by a search engine accompanied by targeted presentations, but other formats might occur as well.

HTML is a common format used for pages or other content that is supplied from an HTTP server. HTML-formatted content might include links to other HTML content and a collection of content that references other content might be thought of as a document web, hence the name "World Wide Web" or "WWW' given to one example of a collection of HTML-formatted content. As that is a well-known construct, it is used in many examples herein, but it should be understood that unless otherwise specified, the concepts described by these examples are not limited to the WWW, HTML, HTTP, the Internet, etc.

In a typical search query, the user is presented with a dialog box wherein the user enters search query terms and initiates a request based on those terms. One example of a search is a Yahoo! search. One way to perform a Yahoo! search is by directing a web browser client to the page with the URL www.yahoo.com and entering a search query in the search dialog box provided on that page. In response to such a query, which the web browser client sends to a www.yahoo.com server (or other server as directed by references contained in the page's HTML or other code), the receiving server in turn performs a search or causes a search to be performed and returns search results to the web browser client, usually in the form of a page or pages with search results and possibly other presentations.

The other presentations might include keyword-based advertisements and keyword-based sponsored links. With keyword-based presentations, an entity desiring that the presentation be presented to a user or set of users agrees to terms with the operator of the search server, or its agent or provider, wherein the presentation is presented to users that use designated keywords in their search request and meet other state criteria. However, because of the large number of possible keywords that a user might use, the large number of potential advertisers, and the large number of searches performed by top search servers, there is a need for streamlining and simplifying the process of making such arrangements.

BRIEF SUMMARY OF THE INVENTION

A presentation system according to embodiments of the present invention accepts presentations or references to presentations from prospective presenters. Some or all of the presentations or references are stored in a database and referenced by keywords such that presentations to be presented in response to particular searches can be identified. A presentation manager handles accepting bids and settling terms between prospective presenters. The results of such processes might be stored in a presentation details database. A presentation server handles retrieving presentations from the presentation details database for presentation to users along with requests such as search results. Both the presentation manager and the presentation server can operate on a keywords-basis, wherein presentation terms specify keywords to be associated with particular presentations and the presentation server serves particular presentations based on keywords in a search query for which the presentations are to be returned. The association of keywords can be done using canonicalization so that, under certain conditions, different keywords are treated as the same keyword. Canonicalizations might include plural/singular forms, gender forms, stem word forms, suffix forms, prefix forms, typographical error forms, word order, pattern ignoring, acronyms, stop word elimination, etc. Conditions might include aspects of the search query state, such as the user's demographics, the page from which the search query was initiated, etc.

Other features and advantages of the invention will be apparent in view of the following detailed description and preferred embodiments.

DESCRIPTION OF THE DRAWINGS

FIG. 3 is an illustration of a search results page including presentations according to embodiments of the present invention.

DETAILED DESCRIPTION OF THE INVENTION

Embodiments of the invention will now be described, by way of example, not limitation. It is to be understood that the invention is of broad utility and may be used in many different contexts.

The example of a search process as described herein below can be modelled by a searcher presenting to a search system a query and receiving a response (search results) indicating the one or more "hits" found. A query can be in the form of a search query string comprising one or more tokens delimited by delimiters or parsing rules. In addition to varying a search based on variations of the search query string, context might be also taken into account. For example, the querier might have previously set constraints on the search, such as to return only age-appropriate hits, prior searches might be taken into account, and a querier identity (such as the Yahoo! ID currently associated with the Web browser client submitting the search query string) and settings set by the user. Other contexts might be the time of day, the computer being used, the location of the computer (e.g., IP address, physical location, etc.).

The response need not be limited to search results. For example, a searcher might transmit a query and receive a web page in response that includes sponsored search results, search results independent of sponsorship, directory listings, alternative corpus search results, advertisements, links and possibly other elements. One or more of such elements might be dependent on the query and/or search results, but some elements might be independent of the query and search results. For example, a searcher might enter a query string Q and receive in response a web page containing some hits corresponding to Q from one search database, hits corresponding to Q from another search database, presentations corresponding to Q, advertising corresponding to Q, advertising that is independent of Q, page elements that are independent of Q (such as a greeting specific to the user, page elements that always appear on each results page, etc.).

When a query is received by a search system, the search system processes the search and returns one or more "hits", where a "hit" is the atomic unit handled by the search system. Likewise, a presentation system processes the search and returns one or more hits. The search system and presentation system can be the same system, different systems, distinct instances of similar systems using different corpuses, etc. For example, a querying system might include a search system that takes in a query and returns a set of hits that correspond to elements in a search corpus deemed to satisfy the query based on content of the query and those elements, and the querying system might also include a presentation system that takes in a query and returns a set of hits that correspond to presentations selected from a set of presentations (such as a presentations database) that are selected based on some presentation criteria or rules. One example of presentation criteria would have the presentations associated with elements of the query, possibly independent of the content of the presentation, such that a presentation is likely to be returned as part of the response when the query contains a particular term.

The search system corpus can be free-form text, files, database records, web pages, data object or the like. Where the search corpus is a structured database, the hits are records from the structured database. Where the search system manages documents, such as text documents, image and text documents, image documents, HTML documents, PDF documents, or the like, the hits are documents. It should be understood that the present invention is not limited to any particular atomic unit, but by way of example, much of this disclosure describes searching using the document as the atomic unit. In general terms, a query is sent to a query system, which applies the query and/or other contexts to one or more systems and receives responses of one or more hits (or no hits, in some cases), back from those systems and supplies that collection of responses (or less than all of the responses if too many responses are provided) to the querier as a response to the query.

In some cases, the returned hits are a function of the content of those hits, but in other cases the returned hits might be independent of the content of those hits. As an example of the latter, advertisements might be returned because the system rules are that a particular advertisement is to be returned in response to particular query terms even if the advertisement does not contain the query term. Of course, with targeted advertising, an advertiser will generally want to limit the presentation of a particular advertisement to users that have an interest in what is being advertised and that is often determined from the user's intent for a search as evidenced by the query string presented.

It should be understood that the search system need not provide all hits or only hits that match the query and that a presentation system need not provide all hits that match presentation rules. For example, the search system might limit the number of hits returned to some number, might apply other limitations to the query term, such as omitting hits that match the query, ignore duplicate hits, etc. The search system might also expand the search results to include hits that almost match the query, hits that are designated to be included in searches, such as special topic hits, advertising hits, etc. Some expansion or contraction might be dependent on the size or content of the search results prior to such expansion or contraction. For example, the search engine might add hits that are close if no hits would otherwise be returned and might remove hits if too many hits would have been returned, such as by deleting common words from queries prior to completing the search results.

A searcher can be a human user, such as a person typing in search terms into a browser window to query a search engine via the Web, but can also be an automated process, such as a computer program capable of sending queries to search engines in the form expected by the search engine. For example, a computer program might generate queries and form HTTP messages directed at a Web server coupled to a search engine.

In many of the examples shown herein, the search engine searches among a set of documents (a corpus) for hits that match the criteria defined by the query. It should be understood that the term "document" is generally used to refer to units of the corpus being searched. A document can be a document, such as a contract, a file, a story, a writing, or the like, but might also be a snippet of text, data that might be considered part of a document in other contexts, program code, image data, a stored file, or the like. Therefore, the term need not be narrowly construed.

Referring now to the figures and using the above definitions, an exemplary search and presentation system will now be described.

Figure 1:
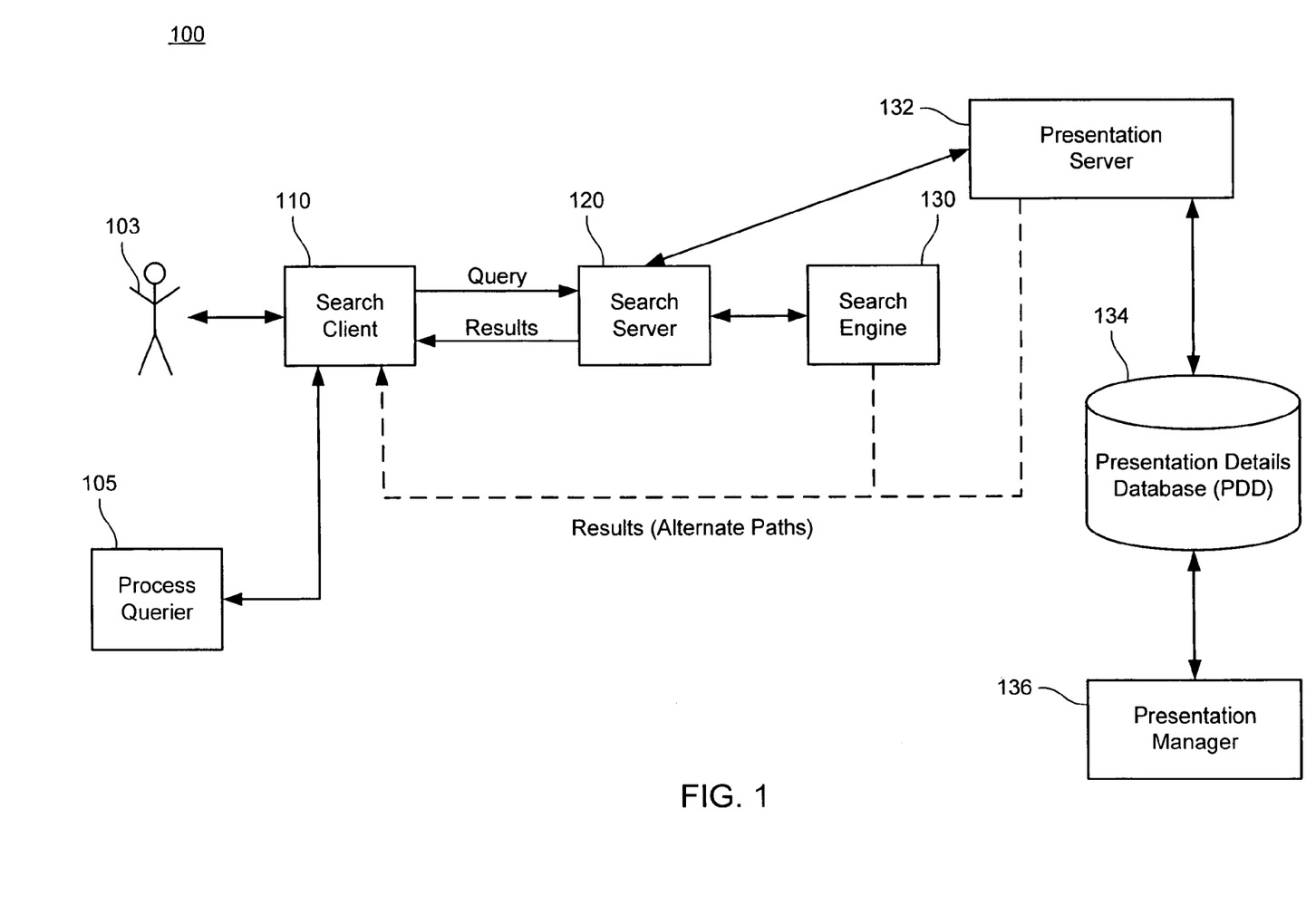
FIG. 1 is a block diagram of a search and presentation system according to embodiments of the present invention.

FIG. 1 is a block diagram of a query system 100 according to embodiments of the present invention. Using query system 100, a querier issues a search request to a search server using a search client, such as a Web browser client. As shown in FIG. 1, a human user 103 or a computer process 105 issues a query using search client 110. The search query, typically in the form of a search query string, is sent to a search server 120, which returns search results responsive to the search query to search client 110 along with zero or more presentations. In other variations, the search query and/or presentation come from one system and the results are routed to another system.

Search server 120 is shown coupled to a search engine 130 and a presentation server 132, which is in turn coupled to a presentation details database (PDD) and a presentation manager 136. The interconnections between various systems need not be described in detail, as such methods of interconnections can be accomplished using well-known techniques.

Search client 110 might be a personal computer running an HTTP client, such as a Web browser client, and communicating with an HTTP server running at search server 120, interconnected over a network such as the global Internet. It should be understood that other embodiments also fall within the scope of the invention. For example, search client 110 might be implemented as a handheld device, a computer with no human user interface, a dedicated device, a kiosk, etc. Also, the clients and servers need not use HTTP, but might use a different protocol for making requests for pages and objects, for responding to those requests and for combining search results with other presentations.

In operation, and as described in further detail below, search client 110 sends a search query string to search server 120, possibly also including context data (other query state) such as a Yahoo! ID of the Yahoo! user sending the request, location of the search client, etc. Presentation server 132 might also use the context data to determine which presentations to return.

Figure 2:
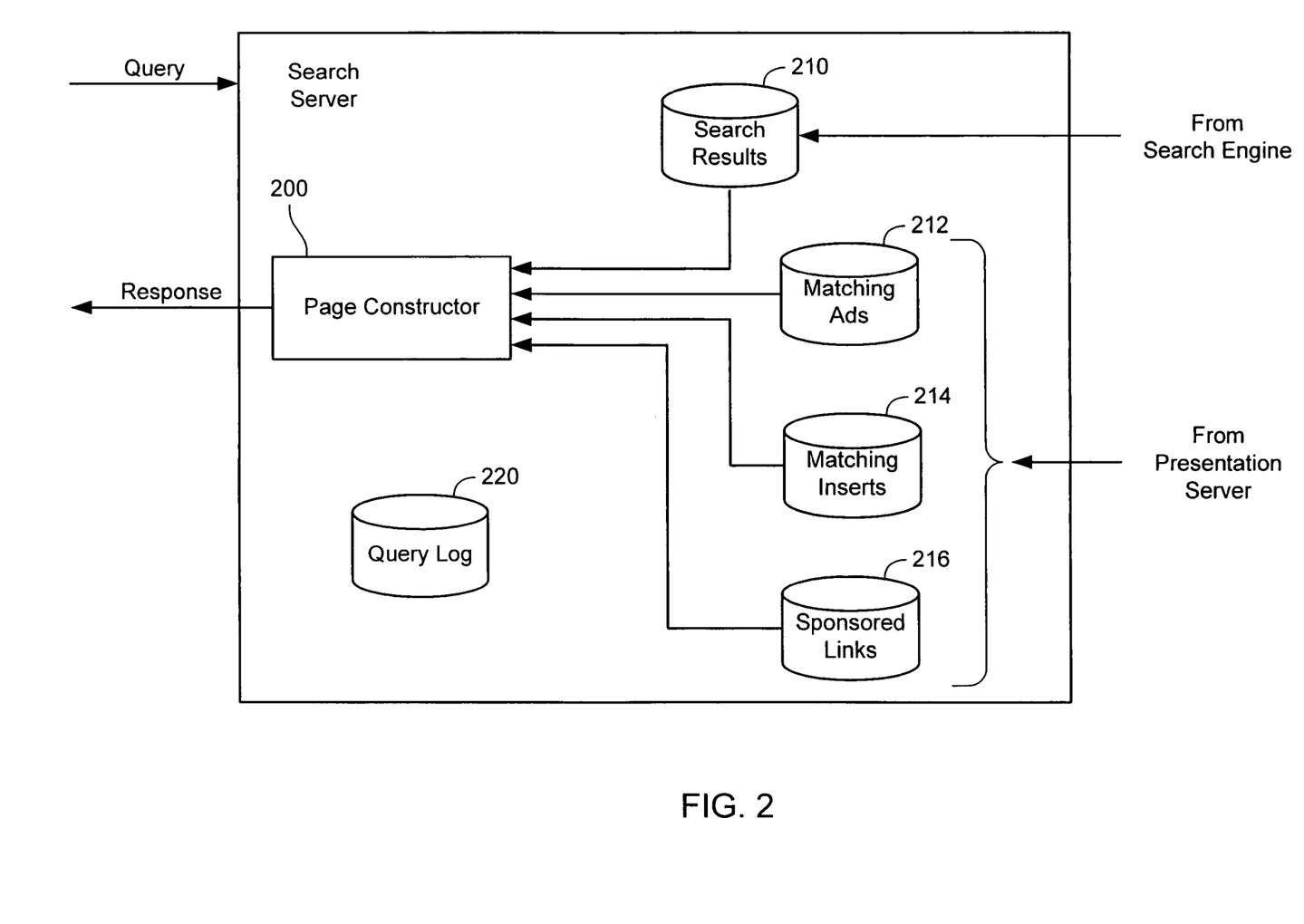
FIG. 2 is a block diagram showing elements of the search server of FIG. 1 in more detail.

FIG. 2 illustrates elements of a search server in greater detail. As shown there, the search server includes a page constructor 200, and storage for search results 210, matching ads 212, matching inserts 214, sponsored links 216 and a query log 220. From a received query, the search server obtains search results 210, either by performing a search itself or by requesting results from another search engine. Typically, a search is performed using an index to the corpus being searched, such as a keyword index. In that case, the search results 210 are the hits that are generated based on the index. Elements 212, 214 and 216 are, in this example, presentations returned by a presentation server. Other page elements, such as globally used or static presentations might also be involved. Page constructor 200 then generates a page from elements in storage 210-216 and sends the page as a response to the search query.

A query log might be maintained of queries made and the results, as well as some indication of subsequent selections that the user makes from the results. For example, if a user issues a query Q, receives a set of results R, and selects a link S associated with one of the results in the set of results R, the association of Q with S can be stored in a query log.

An example of a page 300 constructed by page constructor 200 is shown in FIG. 3. In this example, the search string was "camera". Page 300 includes information organized into different page layout areas 302, 304, 306, 308, 310, 312 and 314.

The top of page 300 includes an indication of the search, a dialog box in which another search can be initiated, and clickable links for help, home page, etc. Simple search results, such as search results from a Web index for "camera", are listed in layout area 308. In this example, upon a search query using the query string "camera", the search server populates storage 210 with Web search results, and possibly other results. The presentation server, in response to the particular terms of the query string (and possibly other state), generates advertisements, inserts and sponsored links associated with the search terms.

Layout area 308 includes links that represent hits responsive to the search term and are preferably independent of who sponsors links. Layout area 310 is provided for insertion of an advertisement determined by the presentation server. It should be understood that presentations are not limited to advertisements. In some cases, public interest announcements might be used as presentations. For example, if a user enters a search query "skiing mountaintop resort tickets" and there is currently an emergency alert for that resort, a weather advisory might be presented upon a match to those search terms. While non-advertisements such as those might be used as presentations, many of the examples herein will use advertisements as the type of presentation being selected and presented.

Layout area 312 and 214 provide additional matching inserts returned by the presentation server or are generated by the search server. In this example, layout area 312 contains links for executing alternative searches and layout area 314 contains links for other searches. While it is more typically the case that an advertiser pays for a keyword in layout area 310 (e.g., the advertiser gets its advertisement presented in layout area 314 in search results pages resulting from searches that use the keywords that the advertiser paid for), an advertiser might also or instead pay for the right to have presented their message in other layout areas. For example, an interested search service might pay to be the alternative in layout area 314 for some search terms. This might be useful where the interested search service is topic-specific and the terms used are also topic-specific. Thus, if a chemical compounds search system provides detailed searches into its chemical compounds database of interest to only a few searchers using search server 120, then searches that use terms that would likely only be used by someone in that narrow field might result in a results page wherein the narrow interest search engine is presented in layout area 314.

Layout area 302 displays matching inserts 214. In this example, those matching inserts are "Inside Yahoo!" links that relate to the search term. Layout area 304 displays directory matches, which are matches from the Yahoo! directory, a hierarchical arrangement of topics and links associated with those topics at various levels in the hierarchy. Layout area 306 displays sponsored matches, which are hits provided to the user based on sponsorship of particular keywords.

Figure 4:
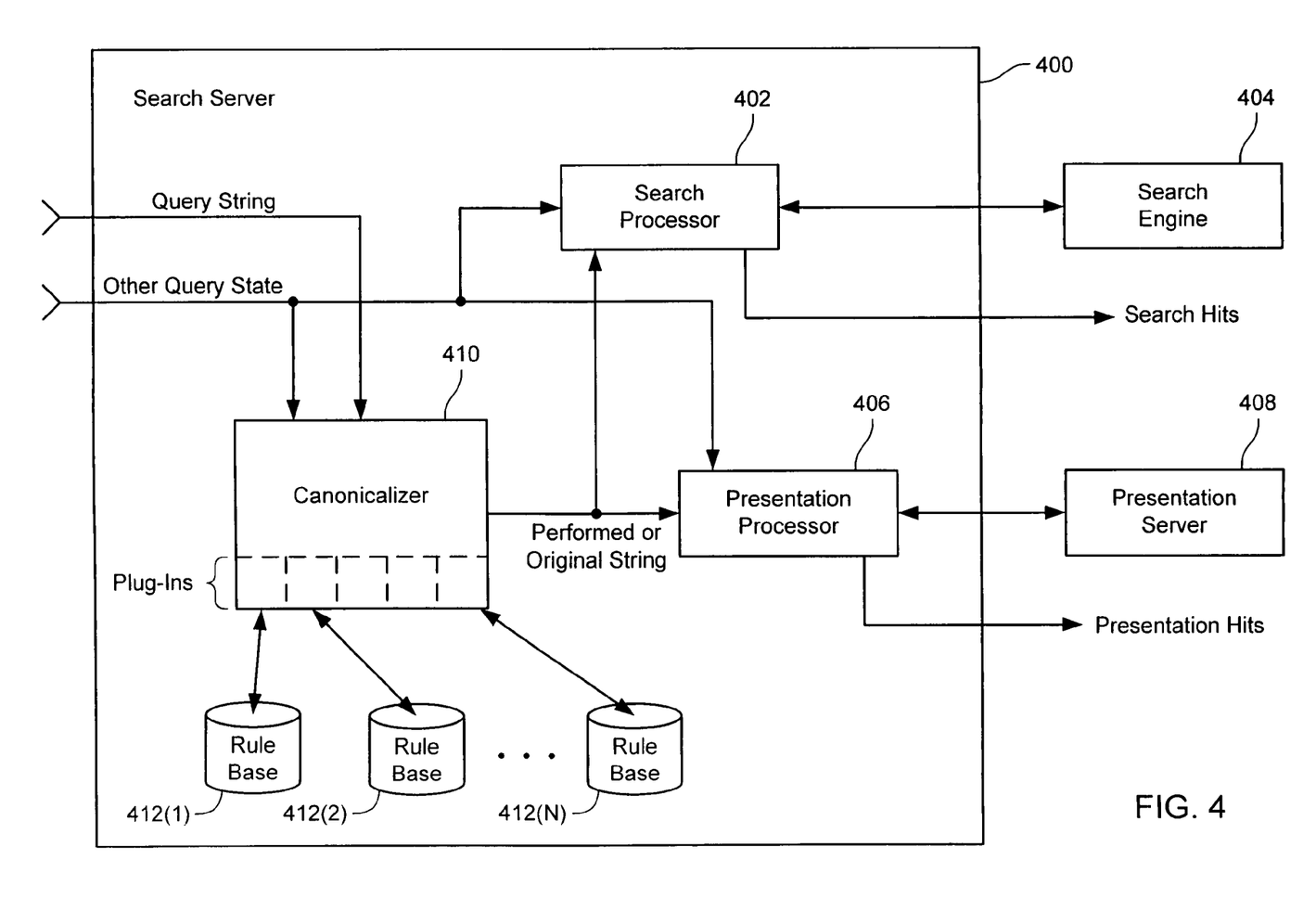
FIG. 4 is a block diagram of one variation of a search server using a canonicalizer with plug-ins to reform search query strings prior to use by a presentation processor.

FIG. 4 illustrates aspects of the invention wherein search terms are canonicalized before being presented to a presentation processor. As shown there, a search server 400 comprises, among other elements not shown, a search processor 402 that couples to a search engine 404, a presentation processor 406 that couples to a presentation server 408, a canonicalizer 410 and rule bases 412 that are interfaced with plug-ins of canonicalizer 410. Other connections exist, but are not shown, such as connections to components that receive the presentations to be presented and the search results.

Canonicalizer 410 takes in a query string and outputs a reformed query string, wherein terms from the query string are replaced with their canonical forms. Of course, for some query strings, if none of the terms of the query string met a canonicalization criteria, the reformed query string would be identical to the input query string. With canonicalization, distinct terms that convey identical user intent, or nearly identical user intent, can be matched such that identical or nearly identical user intent results in a common reformed query string, thereby simplifying and/or improving search results. In preferred embodiments, the input to a presentation processor is the same for different search strings that canonicalize to the same base canonicalization.

Canonicalization also allows for improved keyword-based presentation selection, so that one presentation that is to be shown when a searcher indicates a particular intent can be shown over distinct searches. For example, suppose a presentation P is targeted to searchers that intend to search for telephone calling rates. Presentation P might be associated in a presentation database with the keywords "telephone call rate". With canonicalization, "phone" is reformed to its canonical form "telephone" (one word usage to another), "calling" to its canonical form "call" (suffix removal) and "rates" to its canonical form "rate" (plurals to singular), and spelling errors can also be eliminated using canonical forms. Thus, the query string "fone calling rates" would be reformed to "telephone call rate" and would result in presentation P being presented, regardless of the fact that none of the original query terms are directly associated with presentation P.

Matching is a process of checking two or more search phrases, words or portions of search phrases to determine if they canonically represent the same input despite being different strings. Two approaches to matching might be done. In one approach, inputs are converted before any operations (storing, filtering, forwarding, etc.) into a base canonical form. In that approach, matching is done by checking for an exact match between the canonical forms. In another approach, inputs are represented in their original form, but when two or more inputs are compared, they pass through a canonicalizer and the outputs of the canonicalizer are tested to find identity.

A parallel canonicalization process might be done for search results, as well as for presentation decisions, but it might also not be done, or a different canonicalization process used. Thus, the query might be canonicalized to one reformed search query string for application to a search engine and canonicalized to another reformed search query string for application to a presentation search engine.

Examples of canonicalization are described herein, but it should be understood that the invention is not limited to using just these canonicalizations or using all of these canonicalizations. These canonicalizations can be included or excluded on the fly through the use of plug-ins to a canonicalizer. Each plug-in might have a rule base to indicate the rules for when two distinct words or strings are canonically equal. Alternatively, the plug-ins might provide the canonical form for an input string. In that case, the equivalence of two distinct words or phrases can be determined by passing both through the canonicalizer and checking whether the canonical forms for both inputs are equal. Examples of canonicalizations (the underlying rules define what is canonical) are shown in Table 1.

TABLE 1

| Canonicalization Type | Original Form | Canonical Form |
| --- | --- | --- |
| Capitalization | "dallas cowboys" | "Dallas Cowboys" |
| Singular/Plural (possibly driven by a dictionary) | "dallas cowboy" | "Dallas Cowboys" |
| Word Order | "washington, george" | "George Washington" |

TABLE 1-continued

| Canonicalization Type | Original Form | Canonical Form |
|---|---|---|
| Typographical Error | "washintong" | "Washington" |
| Typographical Error and Word Order | "washintong, george" | "George Washington" |
| Acronym | "AOL" | "America On Line" |
| Abbreviation | "cell phone" | "cellular phone" |
| Punctuation | "Bonnie & Clyde" | "Bonnie and Clyde" |
| Dictionary (This might be a demographic-specific canonicalization) | "automobile" | "car" and "auto" |
| Stop Words (remove protocol words) | "http:", "https:", ".html", "www.", etc. | "" |
| Stop Words (remove articles) | "the", "an", "a" | "" |
| Stop Words (remove propositions) | "of", "to", etc. | "" |
| Stop Words (remove conjunctions) | "and", "or", "nor", etc. | "" |
| Punctuation Removal | any character in the set: ( )<>[]11\\_$%^#!'?_* (unless these characters have meaning in and of themselves, such as "*" used to indicate a wildcard). | "" |
| Replace with Whitespace | any character in the set: &,.+=@/I:; or "//,, | (space) |
| Multiple adjacent spaces | (space)(space)... | (space) |

Search history canonicalization uses a history of user search patterns (such as a log of millions of queries performed using Yahoo! search engines) to identify patterns, such as common acronyms (LOL and "laugh out loud"), common spelling mistakes, and compound words such as "online shopping" and "on line shopping"). Search results canonicalization is based on common search results being selected when shown in response to distinct queries.

A decision as to when to canonicalize might be based on query logs, possibly including at least partial clickstreams. For example, suppose one large set of users searches using search string A and receives hits H1, H2, H3 in response, while another large set of users searches using search string B and receives hits H4, H5, H6 in response and there is some overlap of the set of hits between the two results. If it turns out that many users in both sets are selecting a common hit from the search results even though they received that hit using different search strings, then those two search strings might be flagged as being of the same base canonical form. Thus, if the web page for "Northern Europe Pedalling Tour Guides" shows up in search results for the search string "Danish biking" and in search results for the search string "Scandinavian Bicycling" and searchers for both search strings frequently select the "Northern Europe Pedalling Tour Guides" web page from either search string, the phrases "Danish biking" and "Scandinavian Bicycling" might be canonicalized such that they reduce to the same base canonicalization. Of course, for this example, using just word-based or term-based canonicalization, "Danish" and "Scandinavian" might canonicalize together and "biking" and "bicycling" might canonicalize together, yielding the same results anyway.

Canonicalizations can be applied in varying order or always in the same order for possibly greater consistency. Canonicalizations might also have exceptions and customizations, which can be handled in the same way as other canonicalizations. For example, exceptions might be that "colour" can be canonical with "color" and "telephone" can be canonical with "phone". Exceptions or custom rules can be made to be applied exclusively without any other rules. This exception handling mechanism allows, for example, a product manager or producer to create a custom canonicalization, for example, for a different language.

In addition to word-based canonicalization, term-based canonicalization can also be performed. These two can be used to gather and even recursively. For example, word-based canonicalization might canonicalize "United States of America Air Force" to "United State of America Air Force", then term-based canonicalization might canonicalize it to "USA Air Force", then "USA AF" and then term-based canonicalization might further canonicalize the phrase to "USAF".

The rules and dictionaries, as needed, can be stored in an efficient data structure. A computer implementation for storing the rules and dictionaries for use by a Web server or any number of Web servers, or for use with any number of computer processes to share, can be used to achieve a highly scalable architecture, which can grow with traffic increases without requiring software and data redesign.

One process for generating a dictionary is described here. In this example, a set of nouns are collected, such as from a standard dictionary file. A standard dictionary file is likely to have considerable "noise", so some refinement should be done. First, compound words are be removed from the dictionary. Then, an inflection process is used to convert singular nouns from the set of nouns to plural nouns. An invert mapping of the inflection process is done to convert plural nouns to singular nouns and check for cyclic mappings, wherein the output of the inverted mapping step is compared to the singular nouns input to the inflection process. Singular nouns that do not pass the cyclic mapping check can be flagged, removed or processed specially. Nouns that do not have corresponding plurals in the set of nouns are then removed (e.g. actinomeris, baccharis, qatari, etc.). Some plural forms can be mapped to multiple singular forms (e.g., bases->basis or base), so multiples are removed. Many short nouns are abbreviations and their plural forms are real words with completely different meanings (e.g., WA is an abbreviation for Washington State, and the apparent plural "was" is an unrelated word). Some singular forms are themselves plural forms, which have their singular forms (e.g., algaes->algae->alga), so the various transitive mappings should be consolidated into one (e.g., algaes->alga).

Other types of conversions might also be included, such as changing dialects (e.g., British English "colour" to American English "color", or vice versa), popular short forms ("telephone" to "phone") and singular nouns that have multiple plural forms ("antennae" and "antennas" are both plural forms of "antenna").

Figure 5:
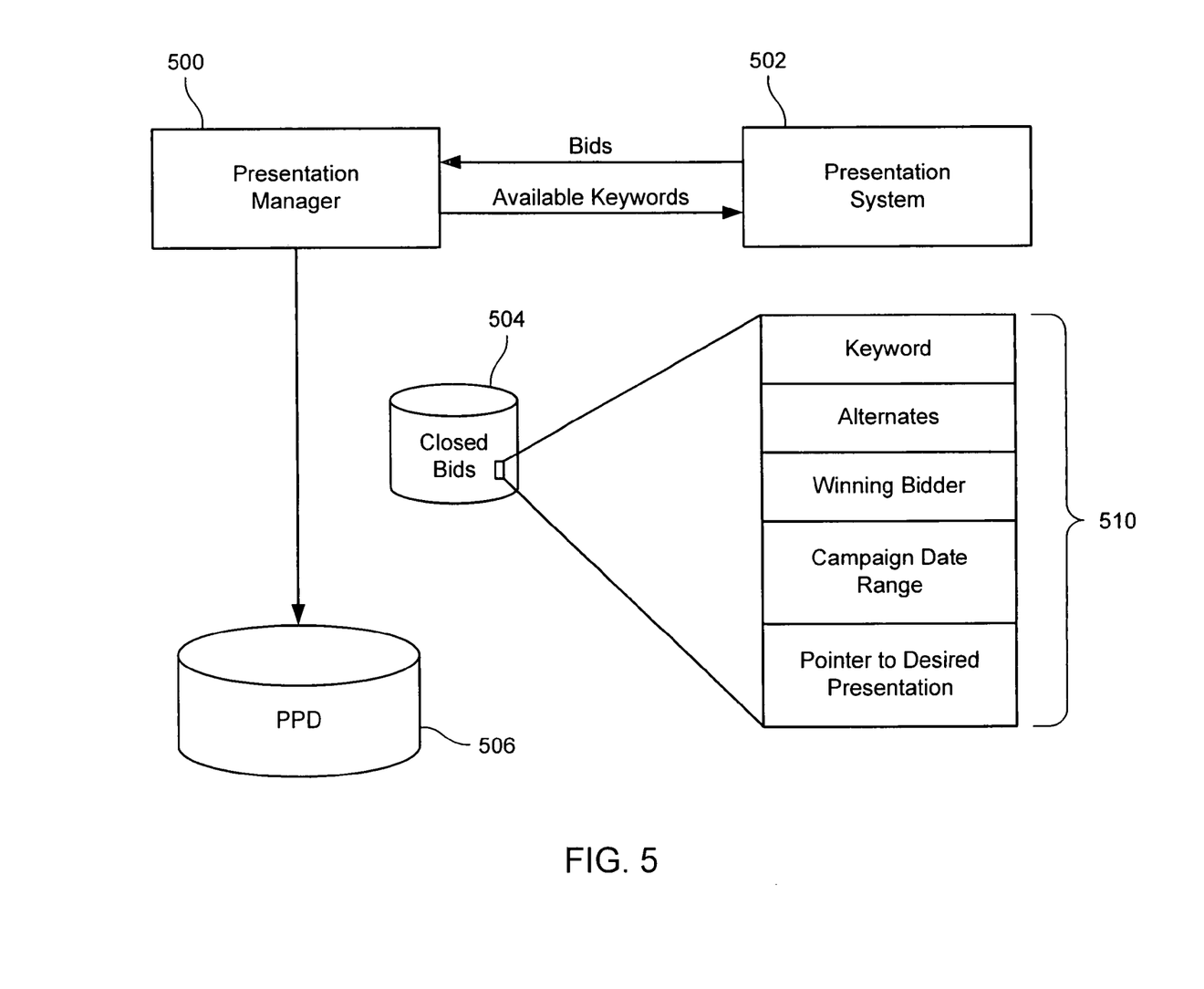
FIG. 5 is a block diagram illustrating a presentation manager.

FIG. 5 illustrates a presentation manager 500 that might be used to populate a PDD 506 and arbitrate bids from competing advertisers or other presenters for keyword allocation. In one aspect of the present invention, keyword and phrase canonicalization that occurs in canonicalizer 410 (FIG. 4) also occurs in a canonicalizer within the presentation manager.

A prospective presenter might interact with presentation manager 500 using a presenter system 502. In some implementations, the interaction is performed by a sales agent for the operator of the search and presentation system, but in other implementations, the bidding process can be "self-serve", wherein prospective presenters interact directly with presentation manager 500 to select keywords and other criteria for a presentation campaign, identify which keywords are available and unavailable and under what conditions, pay for the presentation services, and provide the presentation or a reference to the presentation. Once a bid is finalized, a closed bid 504 is stored in PDD 506, providing the presentation server access to the particular campaign details. An example of a closed bid 510 is shown. The elements shown are a keyword, alternates, the winning bidder's ID, a campaign date range, and a pointer to a desired presentation. Of course, bids might have fewer fields or more fields than shown. It is not necessary for closed bid 504 to contain payment details, if presentation manager 500 handles those details.

In an example of usage of the system shown in FIG. 5, suppose a presenter decides to submit bids for a sponsored link to the presenter's car dealership. The presenter might decide the present each time someone searches for "car dealers". Since the user intent is arguably the same for a search for "car dealer" and "car dealers", the same presentation might be shown to each. Rather than require the bidder to bid on each variation, the bidder can bid on the canonical form, or any variation that maps to a canonical form. If the canonical forms are determined on the fly, then the bidder has the advantage that later developed variations (such as unexpected misspellings) would also be include in the bid.

The presenter might pick a date range for the campaign, a number of hits, number of clicks, or other limitation on the exposure. If that does not overlap with already promised and closed bids, it can be granted to the presenter. As part of the process, the presenter provides the presentation or a reference to a presentation. For example, the presenter might provide a banner advertisement image and associated click-through links, which could then be stored in PDD 506. Alternatively, the presenter might just provide a URL that points to a server managed by the presenter, thus allowing the presenter to more closely monitor the number of presentations that are occurring.

This self-service aspect of the presentation manager allows individual presenters to "browse" available campaigns and to choose among the available slots without requiring an intermediate sales step. However, in some cases, such as for complex campaigns and new users, a sales agent might intermediate to ensure that the presenter is able to get the most satisfactory campaign. Some campaigns might be quite complex, such as a campaign to have a minimum of 10,000 page views on search results where "car dealer" or any of its variations that would canonicalize to "car dealer" appears in a search query between 8 AM and 5 PM on a business day for searches within the Yahoo! Business property, nonexclusive to other presenters using that same keyword, and exclusive of other presenters using that same keyword within the Yahoo! Yellow Pages property on weekends.

Canonicalization has a number of benefits. It allows a presenter to reach an intended target audience even if members of the audience enter variations of the purchased keyword. It also allows a presenter to preclude others from bidding and winning on variations of the presenter's trademarks without the presenter having to separately bid on all the possible variations of the trademark. Another advantage is that a presenter would not have to guess ahead of time which of several valid variations might be used the most.

Canonicalization of search phrases either increases the relevant information found or reduces the complexity of finding relevant information for users. In the ever-increasing Web space, this process has become more and more critical.

Presentation manager 500 canonicalizes the bids, so that the presenter winning the bid for "car dealers" also gets to present for searches on "car dealer" (singular vs. plural), "car, dealer" (punctuation canonicalization) and "car deeler" (spelling canonicalization).

Figure 6:
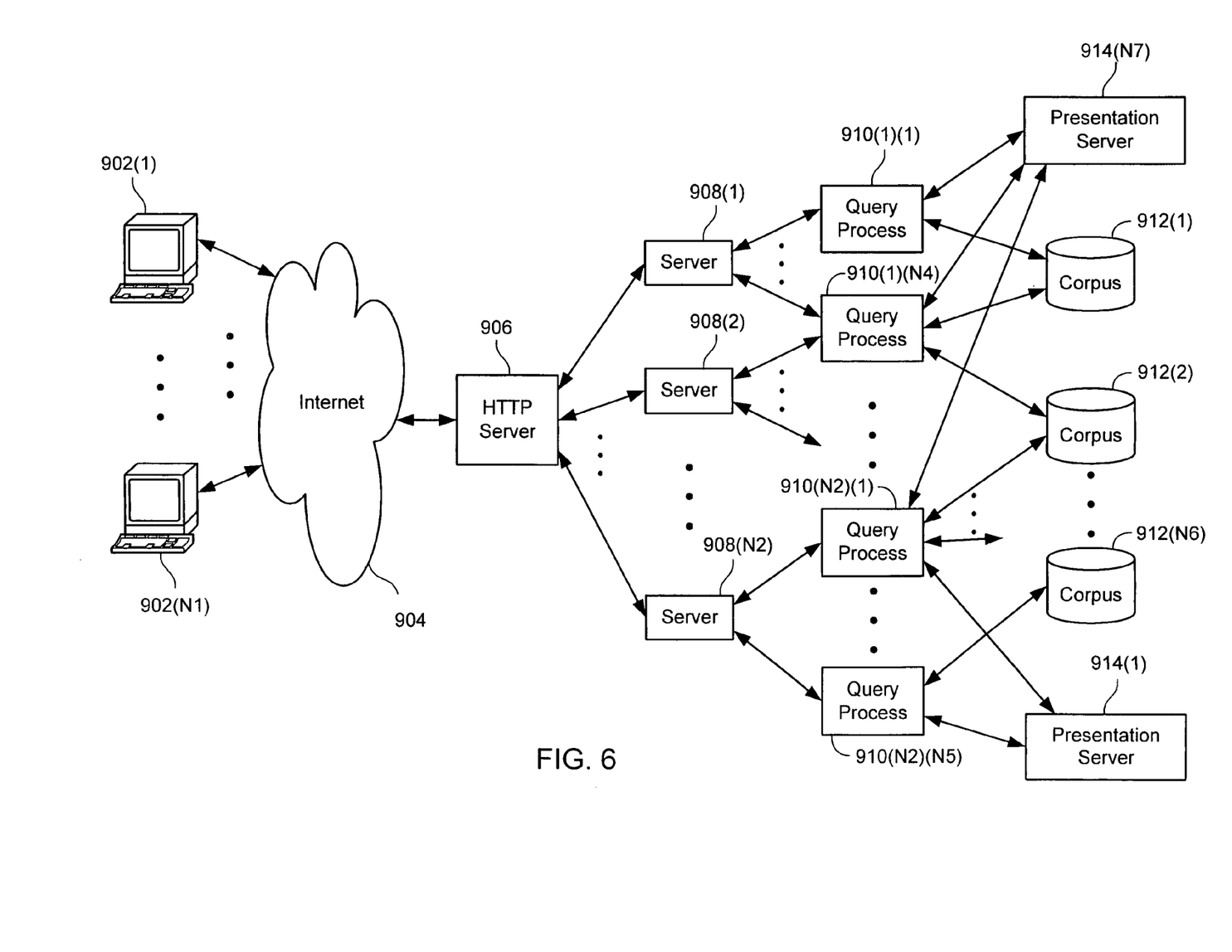
FIG. 6 is a block diagram of a distributed search and presentation system as might be used to process queries received and results presented as described herein.

FIG. 6 shows a networked system in which a plurality of search clients can access a search system to apply queries to a corpus of documents. In this system, one or more (but possibly thousands or more) client systems 902 make requests via the Internet 904. The requests flow to servers 908 via an HTTP server 906, but it should be understood that multiple HTTP servers might be present and other protocols might be used instead of, or in addition to, HTTP. A server 908 sends the query to a query process 910, which might be an instantiation of a software object in server 908 or elsewhere, or might include hardware components. The query processes 910 then parse the search query strings and obtain documents, references to documents, links, or other indications of hits, from one or more corpuses 912. In generating results, query processes 910 might send their query terms to a presentation server that will return presentations to be included with the search results, such as advertisements, alerts, messages, notices, links and the like.

In some embodiments, corpuses 912 are complete copies of the entire corpus, but in other embodiments, the corpuses 912 are subsets of the complete corpus. In the latter case, server 908 or server process 910 can determine, from the query and possibly other information, which corpus to use. Note that in some cases, one query process 910 might access more than one corpus 912, even for a single query.

In FIG. 6, multiple instances of objects are differentiated by a parenthetical index, such as 902(1) for a specific instance of a client system 902. For various objects, the terminal index is some unspecified number, such as "602(N1)". Where the number of objects is not required to be the same, the terminal indices are indicated with distinct variables. Thus, while exactly three servers 980 and three corpuses 912 are shown in FIG. 6, there are N2 (an indeterminate number) servers and N6 (another indeterminate number) corpuses 912 implied by FIG. 6, so a one-to-one correspondence of servers to corpuses is not required. Unless otherwise specified, different terminal indices can have the same or different values ranging from one to numbers larger than one.

The invention has now been described with reference to the preferred embodiments. Alternatives and substitutions will now be apparent to persons of skill in the art. Accordingly, it is not intended to limit the invention except as provided by the appended claims.

What is claimed is:

1. A method comprising:

receiving a request from a user in the form of a search query string to be executed against a search corpus repository;

canonicalizing one or more terms in the search query string to form a reformed search query string when the one or more terms meet canonicalization criteria, wherein the reformed search query string is not used to determine a set of content items that satisfies the search query string;

applying the reformed search query string as an input to a presentation processor; and selecting, from a presentation repository that is distinct from the search corpus repository, using the presentation processor, a presentation that is an item to be included, along with the set of content items, in a response to the request, wherein selection of the presentation to be included in the response is performed by matching terms in the reformed search query string with keywords associated with the presentation, wherein at least one term in the reformed search query string is a canonicalization of at least one of the one or more terms of the search query string meeting the canonicalization criteria.

2. A method comprising:
in response to receiving a first query associated with a first set of terms, presenting a first requestor with a first set of content items that satisfy the first query;
in response to receiving a second query associated with a second set of terms, presenting a second requestor with a second set of content items that satisfy the second query;
wherein the first set of content items and the second set of content items are different sets of content items, and wherein the first set of content items and the second set of content items have a particular content item in common;
upon determining that the first requestor selected the particular content item from the first set of content items and the second requestor selected the particular content item from the second set of content items, associating the first set of terms with the second set of terms; and
upon receiving a third query, processing the third query based, at least in part, on the association between the first set of terms and the second set of terms.

3. The method of claim 2 wherein;
the third query is in the form of a search query string;
the processing of the third query comprises canonicalizing one or more terms in the search query string to form a reformed search query string; and
any occurrence of either the first set of terms and the second set of terms in the search query string is canonicalized to the same base canonical form.

4. The method of claim 2 wherein:
the third query is in the form of a search query string; and
the processing of the third query comprises:
if the search query string contains the first set of terms, then canonicalizing the first set of keywords to the second set of terms; and
if the search query string contains the second set of terms, then canonicalizing the second set of keywords to the first set of terms.

5. A computer-readable storage medium storing instructions which, executed by one or more processors, causes the one or more processors to perform the steps of:
receiving a request from a user in the form of a search query string to be executed against a search corpus repository;
canonicalizing one or more terms in the search query string to form a reformed search query string when the one or more terms meet canonicalization criteria, wherein the reformed search query string is not used to determine a set of content items that satisfies the search query string;
applying the reformed search query string as an input to a presentation processor;
selecting, from a presentation repository that is distinct from the search corpus repository, using the presentation processor, a presentation that is an item to be included, along with the set of content items, in a response to the request, wherein selection of the presentation to be included in the response is performed by matching terms in the reformed search query string with keywords associated with the presentation, wherein at least one term in the reformed search query string is a canonicalization of at least one of the one or more terms of the search query string meeting the canonicalization criteria.

6. A computer-readable storage medium storing instructions which, executed by one or more processors, cause the one or more processors to perform the steps of:
in response to receiving a first query associated with a first set of terms, presenting a first requestor with a first set of content items that satisfy the first query;
in response to receiving a second query associated with a second set of terms, presenting a second requestor with a second set of content items that satisfy the second query;
wherein the first set of content items and the second set of content items are different sets of content items, and wherein the first set of content items and the second set of content items have a particular content item in common;
upon determining that the first requestor selected the particular content item from the first set of content items and the second requestor selected the particular content item from the second set of content items, associating the first set of terms with the second set of terms; and
upon receiving a third query, processing the third query based, at least in part, on the association between the first set of terms and the second set of terms.

7. The computer-readable storage medium of claim 6, wherein:
the third query is in the form of a search query string;
the processing of the third query comprises canonicalizing one or more terms in the search query string to form a reformed search query string; and
wherein any occurrence of either the first set of terms and the second set of terms in the search query string is canonicalized to the same base canonical form.

8. The computer-readable storage medium of claim 6, wherein:
the third query is in the form of a search query string; and
the processing of the third query comprises:
if the search query string contains the first set of terms, then canonicalizing the first set of keywords to the second set of terms; and
if the search query string contains the second set of terms, then canonicalizing the second set of keywords to the first set of terms.

* * * * *